No. 866,902. PATENTED SEPT. 24, 1907.
T. ADAMS, DEC'D.
J. D., T. & M. E. ADAMS, EXECUTORS.
MACHINE FOR WRAPPING MERCHANDISE.
APPLICATION FILED JULY 28, 1902.
10 SHEETS—SHEET 4.

WITNESSES:

INVENTOR:
Thomas Adams.
BY
ATTORNEYS.

No. 866,902.

PATENTED SEPT. 24, 1907.

T. ADAMS, DEC'D.
J. D., T. & M. E. ADAMS, EXECUTORS.

MACHINE FOR WRAPPING MERCHANDISE.
APPLICATION FILED JULY 28, 1902.

No. 866,902.  PATENTED SEPT. 24, 1907.
T. ADAMS, DEC'D.
J. D., T. & M. E. ADAMS, EXECUTORS.
MACHINE FOR WRAPPING MERCHANDISE.
APPLICATION FILED JULY 28, 1902.

WITNESSES:

INVENTOR:
Thomas Adams
BY
ATTORNEYS.

No. 866,902. PATENTED SEPT. 24, 1907.
T. ADAMS, DEC'D.
J. D., T. & M. E. ADAMS, EXECUTORS.
MACHINE FOR WRAPPING MERCHANDISE.
APPLICATION FILED JULY 28, 1902.

WITNESSES:

INVENTOR:
Thomas Adams
BY
ATTORNEYS.

UNITED STATES PATENT OFFICE.

THOMAS ADAMS, OF NEW YORK, N. Y.; JOHN D. ADAMS AND THOMAS ADAMS, OF BAY SHORE, NEW YORK, AND MARTHA E. ADAMS, OF BROOKLYN, NEW YORK, EXECUTORS OF SAID THOMAS ADAMS, DECEASED.

MACHINE FOR WRAPPING MERCHANDISE.

No. 866,902.        Specification of Letters Patent.        Patented Sept. 24, 1907.

Application filed July 28, 1902. Serial No. 117,336.

*To all whom it may concern:*

Be it known that I, THOMAS ADAMS, a citizen of the United States, and a resident of the borough of Brooklyn, county of Kings, city and State of New York, have invented certain new and useful Improvements in Machines for Wrapping Merchandise, of which the following is a specification.

My invention relates to machinery or apparatus for wrapping small bodies, such as blocks of gum, chocolate, or the like. In some of its features it resembles the machine embodied in an application filed in my name on the 31st day of August, 1900, and designated by Serial Number 28,675. The present invention, however, in various of its features, antedates that of the application just mentioned, and produces a package of peculiar and distinctive appearance, having the folds made and arranged in a manner not hitherto known, so far as I am aware, and presenting the marked advantage over other wrappers, of completely inclosing the gum wrapped, protecting every portion thereof from the atmosphere, and bringing the final folds to a position where they are firmly held by the external label or wrapper used in this as in similar packages.

The machine about to be described receives and holds in a magazine, a stack or vertical column of cakes or blocks of gum, chocolate, candy, or other substance to be wrapped, delivers them either singly or in predetermined numbers and at stated intervals to the wrapping point, placing the same over two wrapper strips previously brought to and laid across the wrapping space by devices which will be fully explained in the ensuing description.

The wrapper delivering devices act in conjunction with suitable cutting and moistening appliances, the outer wrapper being gummed previously to its introduction into the machine, and the ungummed edge of said wrapper being moistened, preparatory to pressing together the moistened and the gummed edges. In these general features, the machine here shown is similar to the one above mentioned, and except as to matters specifically described, it may be identical therewith.

With this general statement I will proceed to describe in detail the machine represented in the accompanying drawings and embodying my present invention.

In these drawings, Fig. 7, a perspective view showing the wrapper folding slides, and illustrating the manner in which they act to turn over the ends of the inner wrapper and to make the end folds therein; Fig. 7$^a$ being a detail view in further illustration of this operation; Fig. 8, a perspective view of the folding devices showing the manner of forming the first side folds of the inner wrapper; Fig. 8$^a$, a detail view in perspective further illustrating this feature; Fig. 9, a perspective view showing the manner of making the final side folds of the inner wrapper and the initial folds of the outer wrapper; Fig. 9$^a$, a sectional view illustrating in further detail this operation; Fig. 10, a perspective view showing the manner of commencing the final folding or overlapping of the edges of the outer wrapper; Fig. 10$^a$, a perspective view further illustrating this operation; Figs. 11 and 12, sectional views showing the mode of completing the folding and overlapping of the outer wrapper.

*Framework of machine.*—The mechanism by which the various operations are performed is contained in and supported by a general framework, comprising standards A, a horizontal bed or table B, and a vertical cross-bar C. The standards or uprights A are furnished with suitable bearings, in which is carried a main driving shaft 1, on which are secured the various cams by or from which motion is imparted to the moving elements of the mechanism. The shaft 1 may, and preferably will, receive motion through suitable automatic clutch mechanism from another shaft, so that it shall go out of action in the event of any failure of the goods or of the wrappers, and that it may promptly go into action upon the renewal of the same. As this driving mechanism is set forth in another application, and is not involved in the present invention, I have omitted it from the drawings, and I have similarly omitted all detail of devices for feeding, cutting, and placing the outer wrapper blank or trade label, showing only so much thereof as is necessary to make clear the operation of those parts of the machine directly involved in the present invention or improvements.

*General arrangement of mechanisms.*—Upon the bed or table B of the machine there are arranged two troughs or ways, through which are fed the wrapper strips from which the blanks are cut. The inner wrapper is, in the present instance, preferably formed of two layers,—the inner one of paraffined paper, and the outer one of metallic foil. These may be united in any convenient manner, or the paper may be simply superposed upon the foil. Owing, however, to the difficulty of obtaining the foil in great lengths, I deem it advisable to unite them lightly at frequent intervals. The other wrapper is simply in the nature of a label and binder to hold in place the folds of the inner wrapper. The strip from which it is cut is made of convenient length and has the design or printed matter repeated thereon at suitable intervals, so that upon feeding the strip a given distance, and cutting sections therefrom, each section shall contain just the amount of material necessary to form a wrapper, and shall have the printed design properly located thereon. Three sets of transferring grippers are provided, one to grasp and draw off the proper length of wrapper blank for the production of the outside or binding wrapper, the second to seize said wrapper and move with the same to the point where the wrapping is to be effected, and there to deposit the wrapper. The third pair of nippers seizes and draws off the inner wrapper, placing it in position to receive upon it the merchandise to be wrapped, and bringing the blank in proper relation to the cutting device by which the blank is severed from the strip. In their general features, and in their location and order of operation, these parts are closely analogous to those of the machine before referred to.

*Feeding mechanism.*—Projecting forward from the bed or table B is a horizontal track or guideway 2, supported by an arm or bracket 3 from the base of the machine. Slightly above this guideway 2, and consequently above the level of the table B, is a bed or table 4, upon which rests the lower end or base of a column 5, of the cakes, blocks, or bodies of merchandise to be wrapped, these being held in vertical column by a magazine 6, composed of a series of vertical rods suitably stepped at their lower ends in the bed or plate 4, or in the track frame 2 upon which the bed 4 is supported. A horizontal slide 7 is arranged to move over the upper face of the bed or table 4 and in close contact therewith, being held against rising by means of rollers 8 carried by arms projecting outwardly from the base of the magazine, and overhanging the edges of the slide. The outer end of the slide 7 is furnished with rollers 9, which, traveling upon the track or way 2, support the outer end of the slide and guide it in its movements, while at the same time tending to reduce friction between the slide and its supporting track or way.

The slide 7 is made of a thickness equal to that of the block or cake, or to that of the number of blocks or cakes of material to be delivered from the magazine at each stroke of said slide. It moves beneath the lower frame 10 of the magazine, and encountering the side of the block or blocks, pushes it or them beneath said frame 10, and from the bed or table 4, in a horizontal direction, to a rocking bridge or guide 11. A gravitating plate 12, overhanging the inner edge of the bed or table 4 and the bridge or guide 11, serves to hold down the block or cake, or the series of blocks or cakes, as they pass to the inner or delivery side of the bridge or guide 11. The bridge or guide serves not only to support and direct the incoming merchandise until delivered at the point of wrapping or of being placed upon the wrappers, but it has the further function of a clamp to bear upon and hold down the inner wrapper, which immediately surrounds the merchandise, and is preferably,—and for the class of goods for which this machine is particularly designed, a compound wrapper composed of an inner layer of paraffined paper and an outer layer of metal foil.

Figure 3:
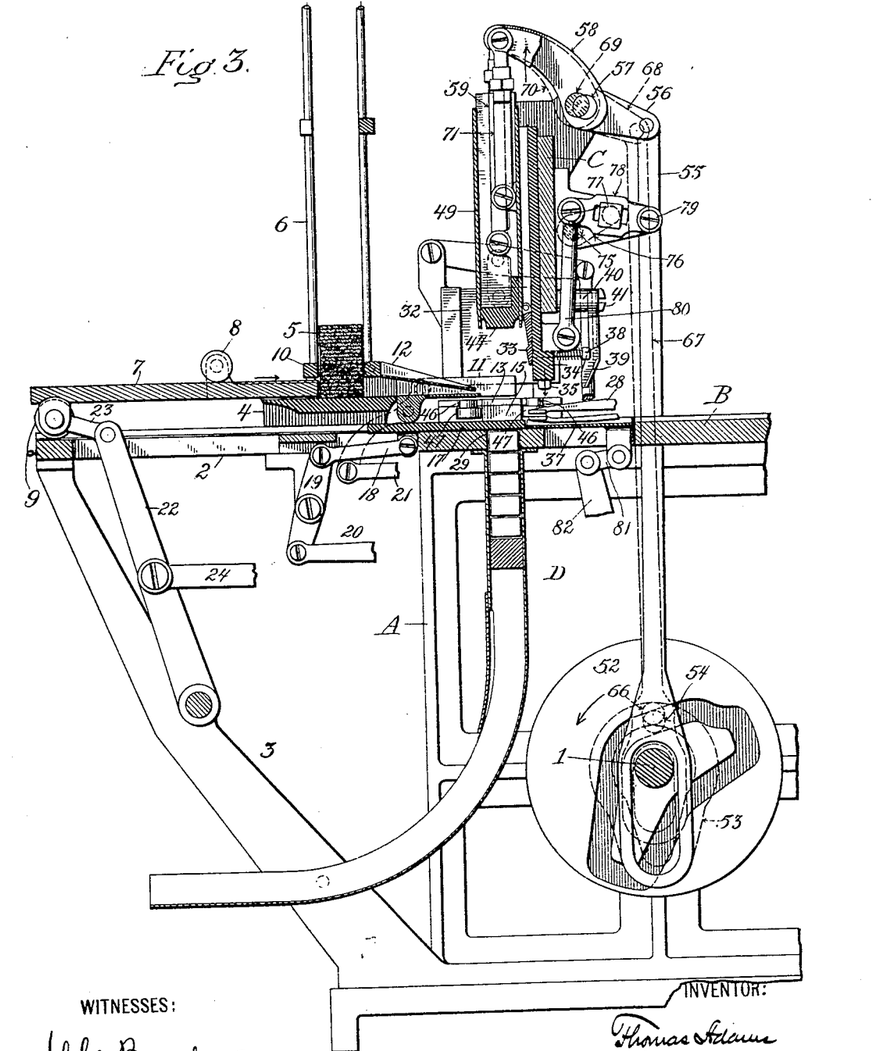
Fig. 3, a vertical section on the line 3—3 of Fig. 1.
Figure 4:
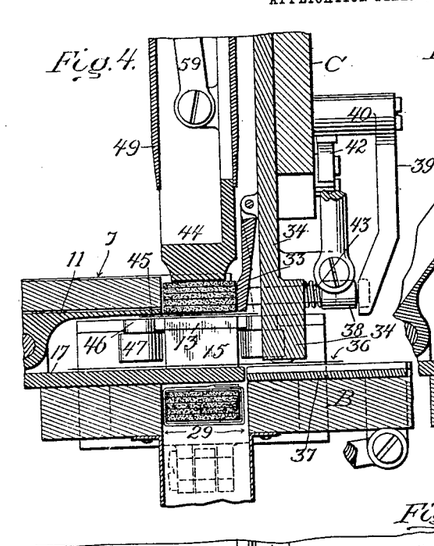
Figs. 4 and 5, vertical sections on a somewhat larger scale, illustrating the feeding and wrapping devices shown in Fig. 3, or a portion of said devices.

The upper face of the bridge is normally in plane with and constitutes a continuation of the bed or table 4. At its inner side or edge it is cut away, as indicated in Fig. 3, to permit the blocks or cakes of material to be deposited and forced downward upon the wrapper and into the folding space or chamber, the inner wrapper at such time being clamped by the inwardly extending end flanges or walls of the bridge upon the upper faces of two slides 13 and 14, as indicated in Fig. 4. The slides 13 and 14, in the present instance, move over guiding blocks or ways 15 and 16, which are of a thickness equal to that of the cake or block or series of cakes or blocks to be wrapped at one time. The inner wrapper therefore lying upon the slides 13 and 14, and clamped thereon by the arms of the bridge or guide 11, will be above the bed or platform B a distance somewhat greater than the thickness of the block or series of blocks to be wrapped. The inner or facing ends of the guide blocks 15 and 16, form limits or boundaries of the space through which the merchandise and its wrappers descend, and act during the descent of the goods to bend or fold upward in a vertical direction, the ends of the inner wrapper; and slides 13 and 14, moving inward toward each other over and beyond the facing ends of the guide blocks 15 and 16, turn or fold down the ends of the inner wrapper and lay them upon the upper face of the merchandise.

Figure 2:
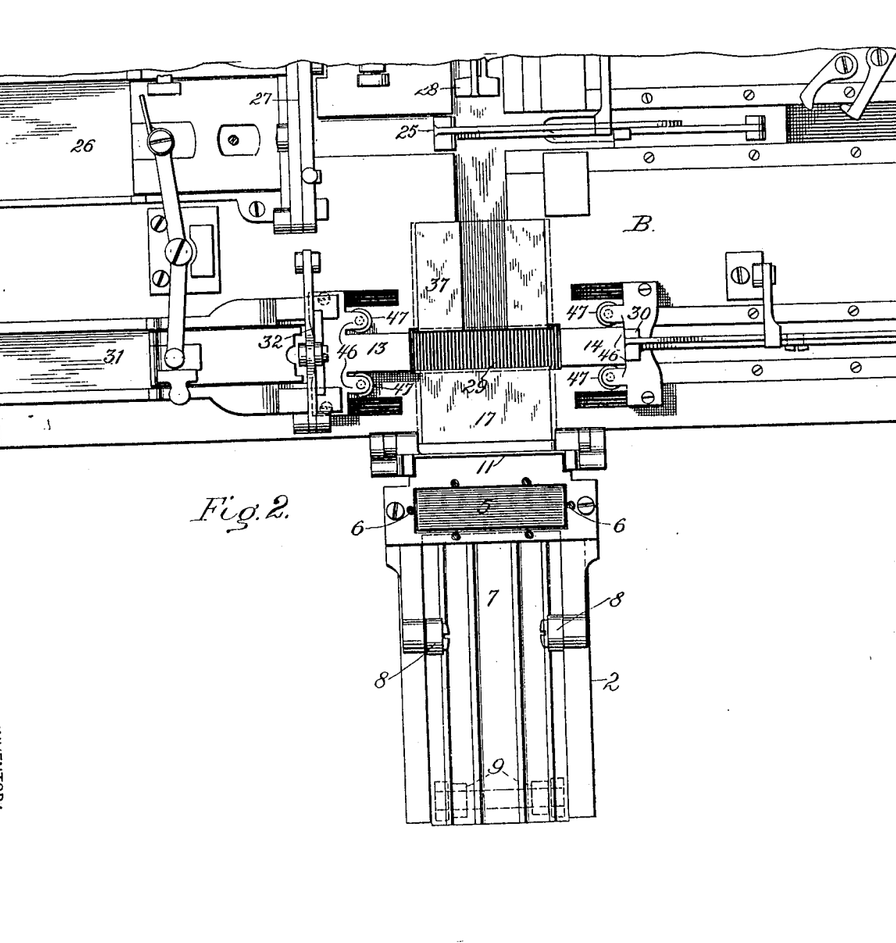
Fig. 2 is a top plan view of the forward portion of the machine, the magazine being represented in horizontal section and the mechanism raised above the table or bed being omitted.
Figure 5:
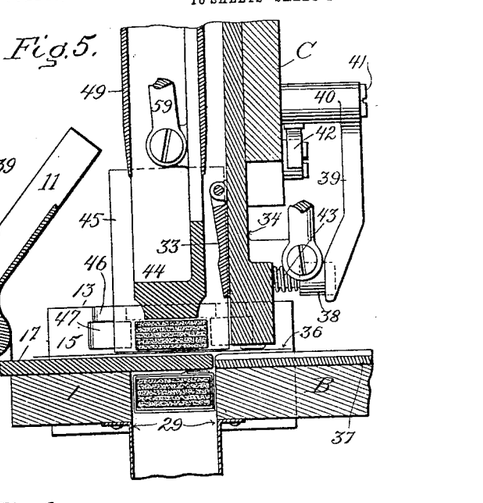

*Folding devices.*—Moving in the track or way 2 beneath the table or bed 4, is a plate 17, one office of which is to support the merchandise during the folding operation or a portion thereof and until the inner wrapper is completely folded, with the exception of turning up the lower longitudinal flap or fold at each side. This slide 17 is connected by a link 18 with a rocking bar or lever 19, which receives motion through a connecting bar 20 from a lever 60 actuated by a cam 61 on the shaft 1, or from any other convenient source. This slide moves beneath the bridge or guide member 11, and its upper face lies in plane, or substantially in plane with the top face of table B. When a package is to be wrapped, it occupies the position shown in Fig. 4, and the bridge member 11, which is pivoted at the side nearest the bed or base 4, occupies the position shown in the same figure, being moved to that position by a link 21 connected to an arm depending from the guide or bridge member, said link being connected with a lever 62 actuated by a cam 63 on the shaft 1, in a manner similar to slide 17. Similarly, the feeder slide 7 is moved by a lever 22, with which it is connected by a link 23, the lever 22 being connected by a rod 24 with another lever 64 actuated by a cam 65 on the shaft 1. All these movements are produced in a manner substantially the same in the present case as in the one heretofore mentioned, and as the arrangement of cams and intermediate connections is variable at will, I have not deemed it necessary to show them here in detail.
A pair of nippers 25, located in line with the trough or guide 26 of the outer wrapper, moves forward at the proper moment, seizes the protruding end of the strip, draws the same longitudinally beneath a cutting device 27, and holds it in the path of a second pair of nippers
28. The requisite length to produce a wrapper blank is severed by the cutting device 27, and the blank is grasped by the nippers 28, which, moving forward at right angles to the line of travel of the nippers 25, place said blank over an opening 29 made in the bed or table B. The nippers 28 then release the wrapper blank and recede to the position indicated in Fig. 2. After the blank for the outer wrapper has been thus positioned, a third pair of nippers 30 moves forward toward the delivery end of a trough or guide 31, which carries the inner wrapper strip, which, as before indicated, will preferably be a compound strip. Grasping the forward or protruding end of the wrapper strip, the nippers recede, drawing from the trough a length sufficient to produce the inner or main wrapper blank.
This blank is severed by a cutter 32, and is drawn by the nippers 30 to a position directly over the opening 29, its ends lying upon and supported by the slides 13 and 14, hereinbefore referred to as folding slides. When drawn to this position, the inner wrapper blank is clamped by reason of the bridge or guide 11 descending from the position shown in Fig. 5 to that shown in Figs. 3 and 4, in which latter it presses upon the blank and holds its ends lightly upon the slides 13 and 14. The two wrappers being thus placed in position, a vertically movable slide 34 descends, and spring-pressed plungers or studs 35 protruding from its lower end, bear upon and serve to clamp the outside wrapper 36 lying upon the slide 17 and upon a second slide 37 hereinafter referred to.
33 indicates a stop arm or gage pivotally attached to or suspended from lugs on the forward or outer face of the slide 34. Attached to the lower end of this slide, and extending through an opening in the latter, is a stem 38 provided with an enlarged and preferably slightly rounded head, as shown in Figs. 3, 4 and 5. In descending with the slide 34, this head encounters and rides upon the beveled face of an arm 39 extending radially downward from a boss or sleeve 40 which is free to rock upon a pivot screw or stud 41. In riding down the beveled face of the arm 39, the stem 38 is moved endwise, and carries before it the gage plate or arm 33 to the position indicated in Fig. 4. The slide 7 is now caused to move forward or inward and to push from the bottom of the stack or column 5 the predeter-
mined number of blocks or cakes of merchandise, forcing the same over the bridge or guide 11 beneath the plate 12 to a position directly over the wrappers and coincident with the opening 29 in the table B. As the gum moves inward it encounters the stop arm 33, and is thereby prevented from moving beyond its proper position over the opening 29.

Figure 6:
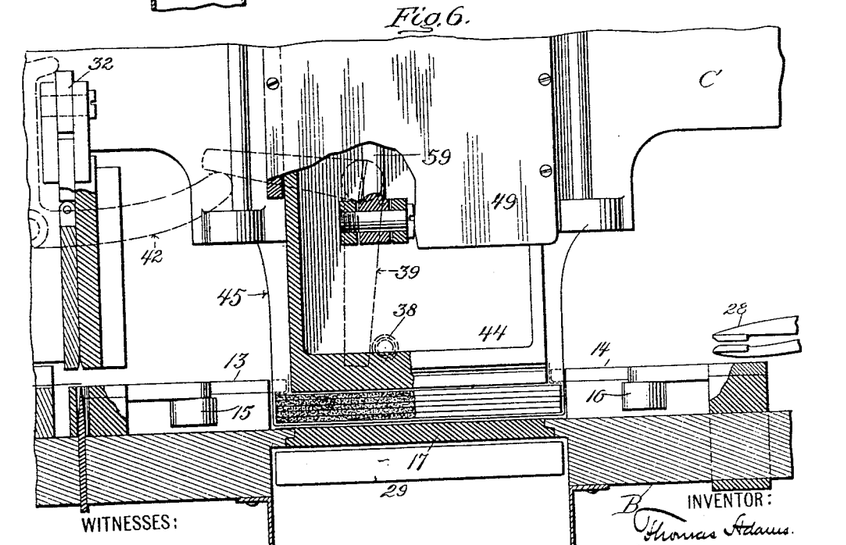
Fig. 6, a front elevation, on the same scale as Figs. 4 and 5, of parts shown in said figures, and of the wrapper cutting devices.
Figure 14:
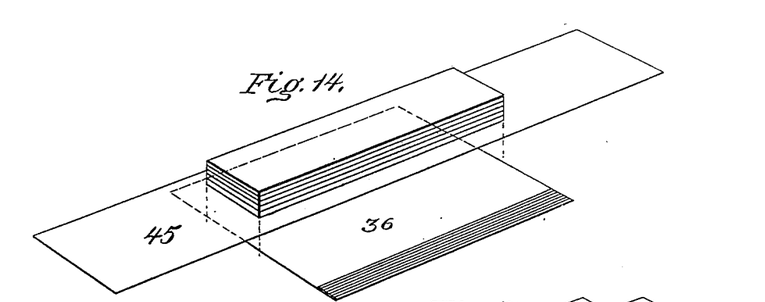
Figs. 14 to 19, both inclusive, perspective views illustrating the formation of the wrapper or the production of the folds therein.
Figure 15:
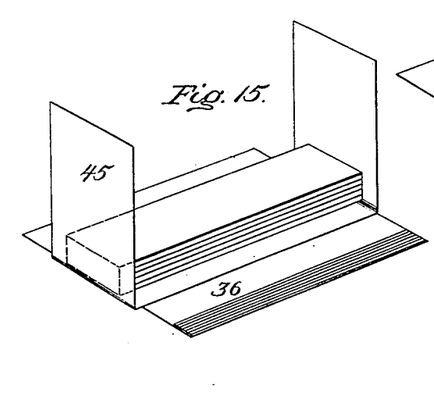

After the gum is placed in position, it is desirable to withdraw the gage or stop arm 33. This is effected by means of an elbow lever 42, seen in dotted lines in Fig. 6 and in perspective in Fig. 23. This lever 42 is fulcrumed upon a suitable support on the machine, and has one arm arranged in the path of the vertically oscillating actuating lever of the cutting device 32, so that upon the ascent of this actuating lever, it shall rock lever 42, causing its arm to take beneath a second and substantially horizontal arm of the lever 39, and to throw its lower end side wise out of alinement with the stem 38. When the stem is thus released it is moved longitudinally backward by means of a spring 43 encircling it, and bearing at one end against the movable plate 34 and at the other end beneath the head of said stem 38. The spring thus serves to move longitudinally the stem 38, and to carry the gage or stop plate to the position shown in Fig. 5. After the stop arm 33 has been thus moved back, a plunger head 44 is caused to descend, bearing at its lower end upon the gum or merchandise to force the same downward with the inner wrapper 45 into the space above the slide 17 and between the proximate ends of the guide blocks 15 and 16. This operation causes the ends of the inner wrapper to be folded upward from the horizontal position indicated in Fig. 14 to the vertical position indicated in Fig. 15, and causes the body or medial portion of the wrapper 45 to be pressed down to and into contact with the outer wrapper 36, the changes of form and position being made plain by comparison of Figs. 14 and 15, the former showing the wrapper strip 45 elevated above the outer wrapper 36, as indicated by the vertical dotted lines. The first and second positions of the gum and wrapper are also indicated by Figs. 4, 5 and 6, Fig. 4 showing the gum in its elevated position and lying upon the inner wrapper 45 immediately above the slides 13 and 14, and Figs. 5 and 6 showing the gum and the upper wrapper pressed down and resting upon the outer wrapper 36.

Figures 7, 7A, 8:
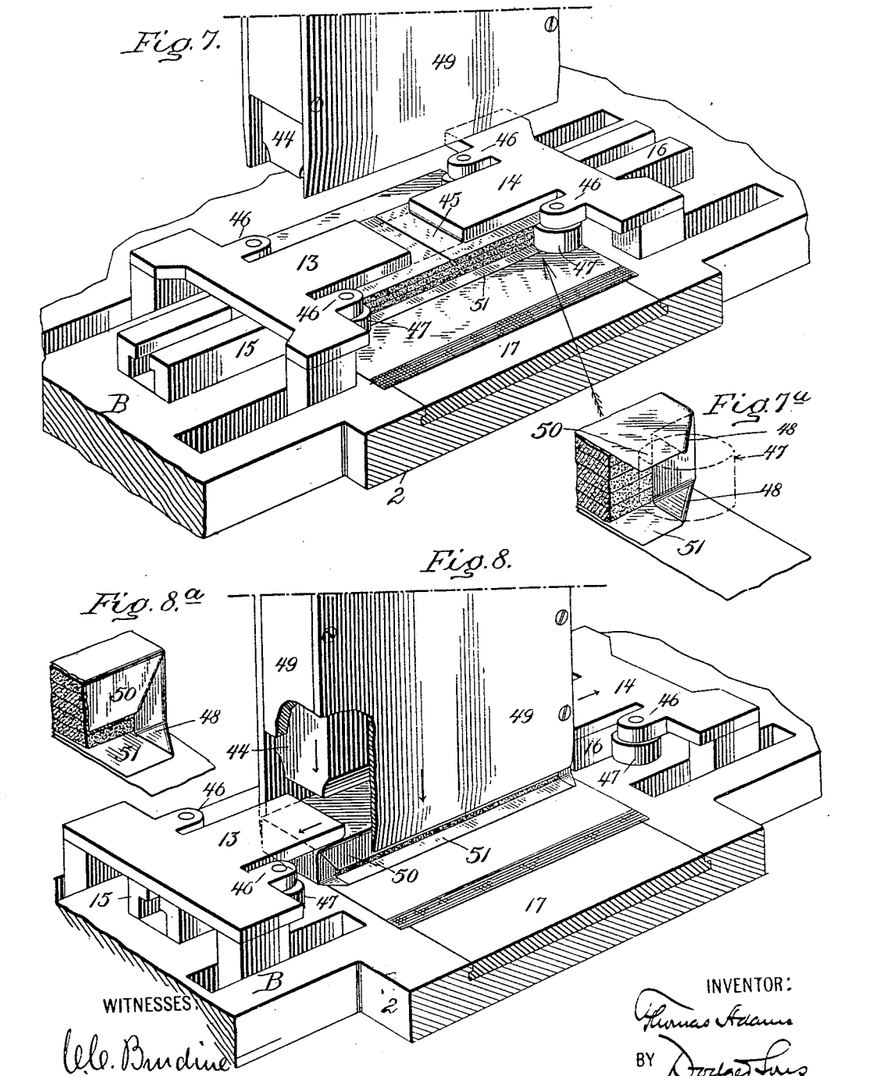
Figure 16:
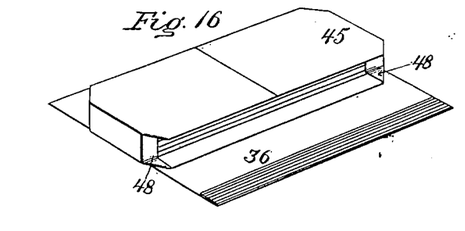
Figure 17:
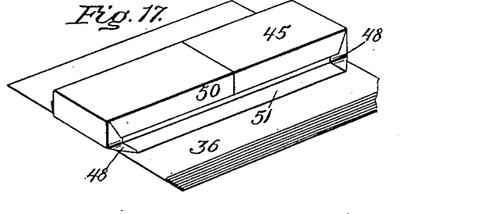
Figure 18:
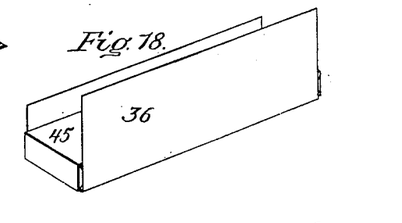
Figure 19:
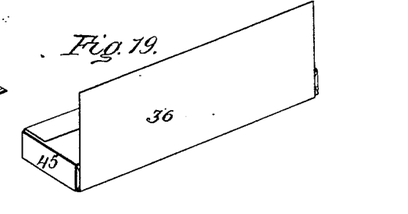
Figure 20:
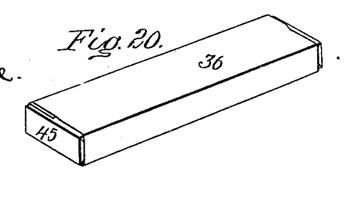
Fig. 20, a perspective view of the completed package.
Figure 21:
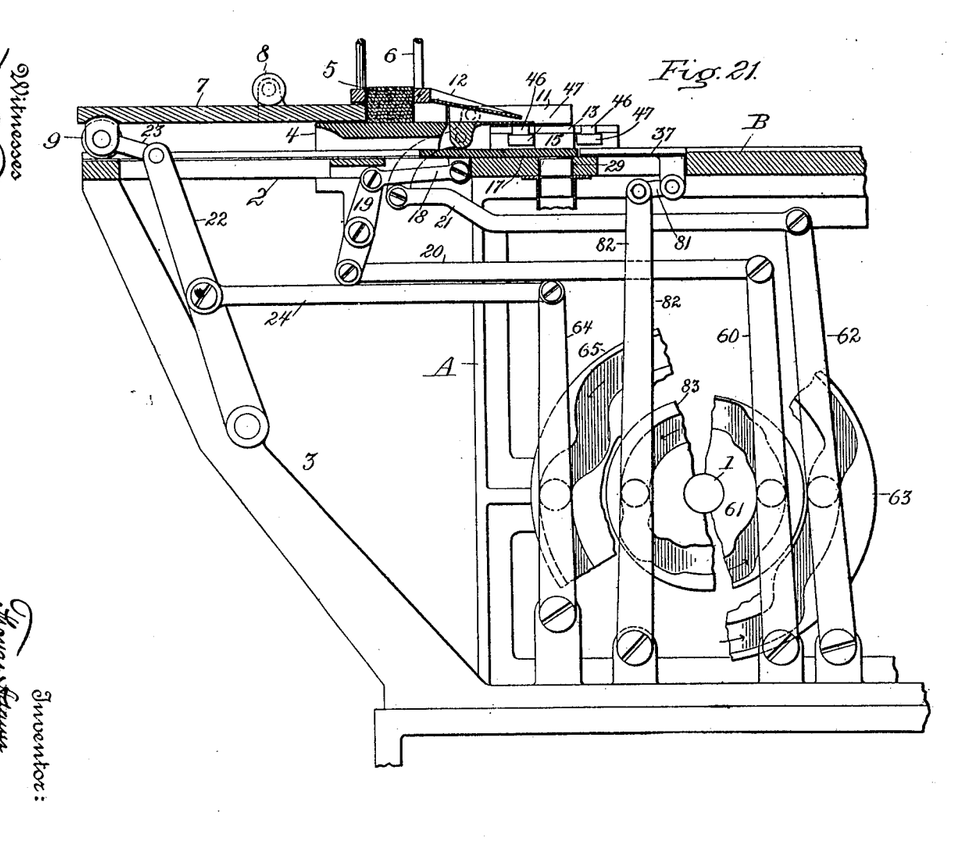
Fig. 21, a vertical sectional view largely diagrammatic in its nature, designed to illustrate the cam and lever mechanism by which motion is imparted to the several slides and working parts, the cams in this case being arbitrarily represented of different diameters to throw them out of line with each other and permit the effective portions thereof to be seen.

The plunger in its descent brings the upper surface of the gum or other merchandise,—whether there be one cake or several,—very slightly below the level of the under face of the slides 13 and 14, which then move inward as indicated in Fig. 7, the initial movement being also indicated by dotted lines in Fig. 6. The movements of the various parts are so timed and arranged that just as the slides 13 and 14 reach the positions indicated by dotted lines in Fig. 6, and thereby obtain a hold upon or over the material to be wrapped, the slide or plunger 44 rises, thus leaving a free way or clearance for the slides 13 and 14 to turn inward and to lie flat upon the top of the gum or other material, the two ends of the wrapper 45. The length of the inner wrapper 45 is preferably such as to permit the inturned ends to overlap a short distance, though this is not requisite. The ends may meet or abut, as indicated in Fig. 7 and in Figs. 16 and 17, especially when, as is ordinarily the case, the outer wrapper is used therewith, because such outer wrapper serves to cover any joint that might be left between the ends and to exclude dust and moisture.

It is advisable, though not essential, that the movements of the slides 13 and 14 be slightly different in time, in order that one end or fold of the inner wrapper may be laid flat in advance of and covered by the other. Each slide 13 and 14 is formed with projecting ears or lugs 46, each of which carries a roller 47, rotatable about a vertical axis. These several rollers are of a thickness or measurement in the direction of their axes equal to the height or thickness of the cake or body of gum or other merchandise to be wrapped. The lugs are set back from the advancing or forward ends of the slides 13 and 14, so that the rollers 47 reach the ends of the cake or body of material shortly before the slides 13, 14, reach their extreme limit of inward movement. As indicated in various of the figures, notably 7 and 8, and Figs. 14 to 17 inclusive, the wrapper 45 is considerably wider than the cake or package of gum or merchandise, and consequently when the ends of the wrapper 45 are folded down upon the body to be wrapped, the vertical or end portions of the applied wrapper project beyond the sides of said merchandise and lie directly across the path of the rollers 47. As a consequence of this, the rollers in their inward movement engage such projecting vertical portions of the wrapper and bend or fold the same in, in the manner best illustrated in the perspective view Fig. 7ª, the same being a detached view on a larger scale of the portion of Fig. 7 to which the connecting arrow extends. This action produces the triangular end folds 48, shown in said Fig. 7ª, and in Fig. 14. The ends of the wrapper 45 being thus laid flat and the triangular end folds 48 having been made, the slides 13 and 14 withdraw, as indicated by arrows in Fig. 8, and as this occurs, plunger 44 and an incasing slide or shell 49 descend, the latter reaching the wrapper in advance of the plunger 44. This shell 49 is cut away at the ends and brought to a comparatively thin lower edge along its sides, as indicated in Figs. 4 and 5 and 7 and 8. In descending, its side walls encounter the overhanging edges of the wrapper 45, seen in Fig. 7, and bend or fold the same closely down upon the vertical sides of the cake or body of gum or merchandise in the manner plainly illustrated in Fig. 8, thereby producing a longitudinal fold, of which one end is seen in Fig. 8, and the other end is shown on a larger scale in Fig. 8ª, the entire fold being seen in Fig. 17. By reason of the previously formed triangular end folds 48, this flap 50 has its ends slanting inward away from the end of the package, and hence not liable to be caught and turned outward or to make a thick and clumsy projection, detracting from the appearance of the finished package.

Figures 9, 9A, 10, 10A, 11, 12:
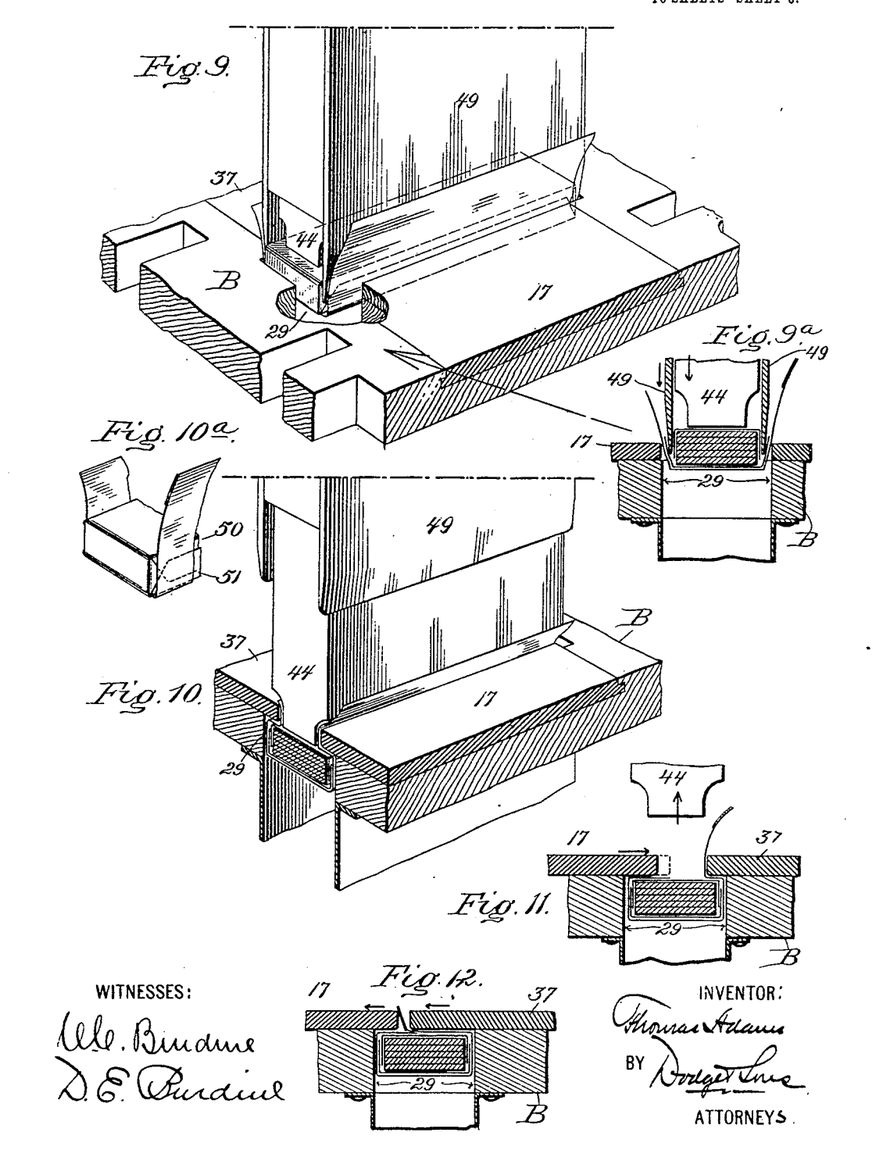

After forming the fold 50, which is done while the merchandise still lies above and upon the slide 17, the shell or outer slide 49 rises, but before this occurs the plunger 44 again descends, and coming into contact with the package, forces the same bodily down into the opening 29 in the bed or platform of the machine, which opening is of a size just sufficient to freely receive the package, and consequently causes the longitudinal flap or fold 51 of the inner wrapper 45, and the portions of the wrapper 36 projecting each way from the merchandise, to be folded or bent, and to assume a substantially vertical position, as indicated in Figs. 9 and 9ª.

The second descent of plunger 44 is of course carried farther than the first, since the first was merely required to bring the gum or other merchandise from the level of the upper face of slides 13 and 14, to a plane immediately beneath said slides, the merchandise resting upon and above slide 17, while the second descent carries the merchandise below the slide 17 and into the opening 29 in the bed or table of the machine.

Prior to the second descent of the plunger 44, to force the partially wrapped merchandise into the opening 29, the slide 17 is of course withdrawn, to uncover said opening. Immediately after the plunger thus forces the package into the opening 29, the slides 17 and 37 move inward for the double purpose of beginning to fold the edges of the outer wrapper 36 over and upon the gum or merchandise, and one upon the other. It is desirable that this action begin before the plunger 44 withdraws or begins its ascent, so that the merchandise may not rise and follow the plunger as it would otherwise be apt to do, owing to the accumulation of freshly wrapped packages in the opening 29, and the space or chute beneath the same. In order to permit this partial inward movement of the slides 17 and 37 before the plunger 44 rises, the latter is cut away at its lower end along each side face, as shown in Figs. 4, 5, 9 and 10, thus letting the slides 17 and 37 reach the positions indicated in Fig. 10 before the ascent of plunger 44 takes place. After the slides 17 and 37 have reached the position indicated, the plunger 44 withdraws, and said slides make further inward movement, the slide 17 advancing to the position indicated in dotted lines in Fig. 11, and then withdrawing, and the slide 37 following up the receding slide 17 and folding down the wider and upstanding flap or fold of the outer cover 36 upon and in contact with the previously folded opposite edge or flap, as indicated in Figs. 11 and 12.

In the present as in the previous case, the outer wrapper is gummed along one edge on its inner face prior to being fed to the cutter and folding devices, and on its travel to position for folding about the merchandise, said wrapper has its opposite edge moistened on the outer face. From this it follows that upon turning or folding over the flap having the moistened outer surface, the moistened face will be caused to lie uppermost, and upon folding and pressing down the opposite flap or fold of the wrapper upon such moistened edge, the two surfaces will be caused to adhere together, and thus the outer wrapper will be firmly secured in place.

From the foregoing description it will be seen that the package is completely enveloped by the inner wrapper, which presents at its ends smooth, unbroken faces, without seam, flap, or fold of any kind, and that the flaps or folds which are produced lengthwise of said package, fall within and are covered and concealed by the outer wrapper. As a consequence a peculiarly symmetrical, neat, and well closed package is produced. Not only in the matter of appearance, but as concerns feeding or delivery of packages from the coin-controlled vending machines in which such packages are extensively used, is this symmetry, and particularly the freedom from projecting flaps, important.

Extending downward from the opening 29 in the bed or table B of the machine, and curving forward toward the front or receiving side of the machine, is a chute or conductor D, which, as in the former machine, serves to guide the packages out of the machine. In starting the machine, it is customary to put in a block or slug fitting somewhat snugly in the chute or conductor, to form a support against which the first packages of a series are pressed when folding the wrapper about them and cementing the same. When the packages accumulate sufficiently to reach around the curved portion of the chute or conductor, and to lie upon the horizontal delivery end thereof, they offer resistance sufficient to serve the purpose mentioned, and the upper packages by their weight press and hold the folded and cemented flaps in close and intimate contact for a time sufficient to insure the proper setting of the gum or cement thereon.

Figure 13:
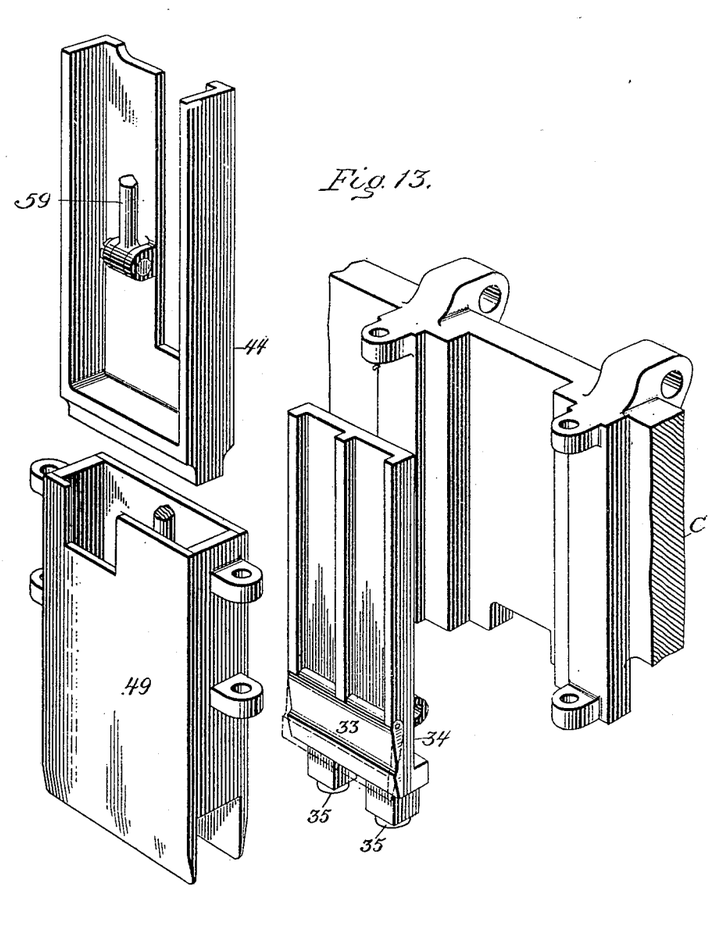
Fig. 13, a perspective view of the vertical head or plunger and its support, the several parts being separated from each other to better illustrate their construction.

The various movements described are produced through cam and lever mechanism essentially like that of my former machine. For the sake of making the present description complete, or at least sufficient to enable the invention herein set forth and claimed to be practiced by those familiar with the art, I will briefly describe the driving mechanism, which is shown in Figs. 1, 2, 3, 21, 22 and 23, the details of the compound plunger being illustrated in Fig. 13, where the parts are shown separated one from another.

Figure 1:
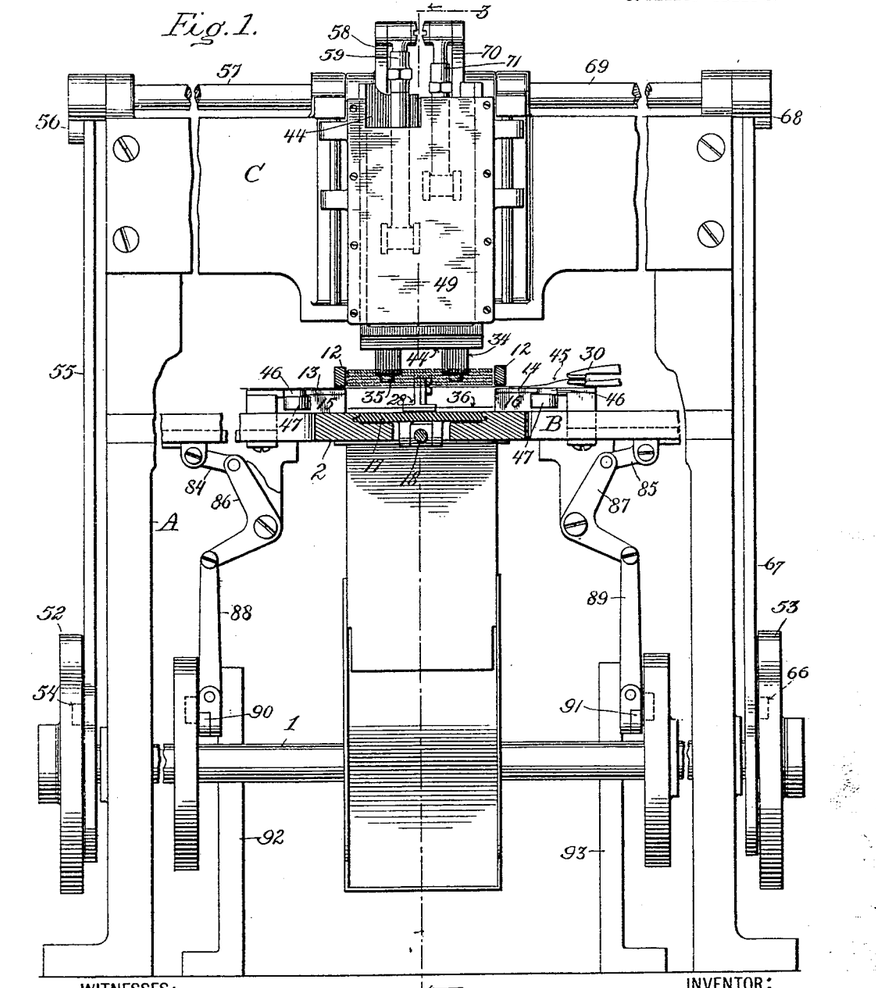
—Figure 1 is a front elevation of the machine, partly in section, treating as the front the side at which the magazine is located, and from which the goods enter the machine. The framing of the machine is broken and the ends brought toward each other, in order to bring the same within the limits prescribed for patent drawings.
Figures 22, 23:
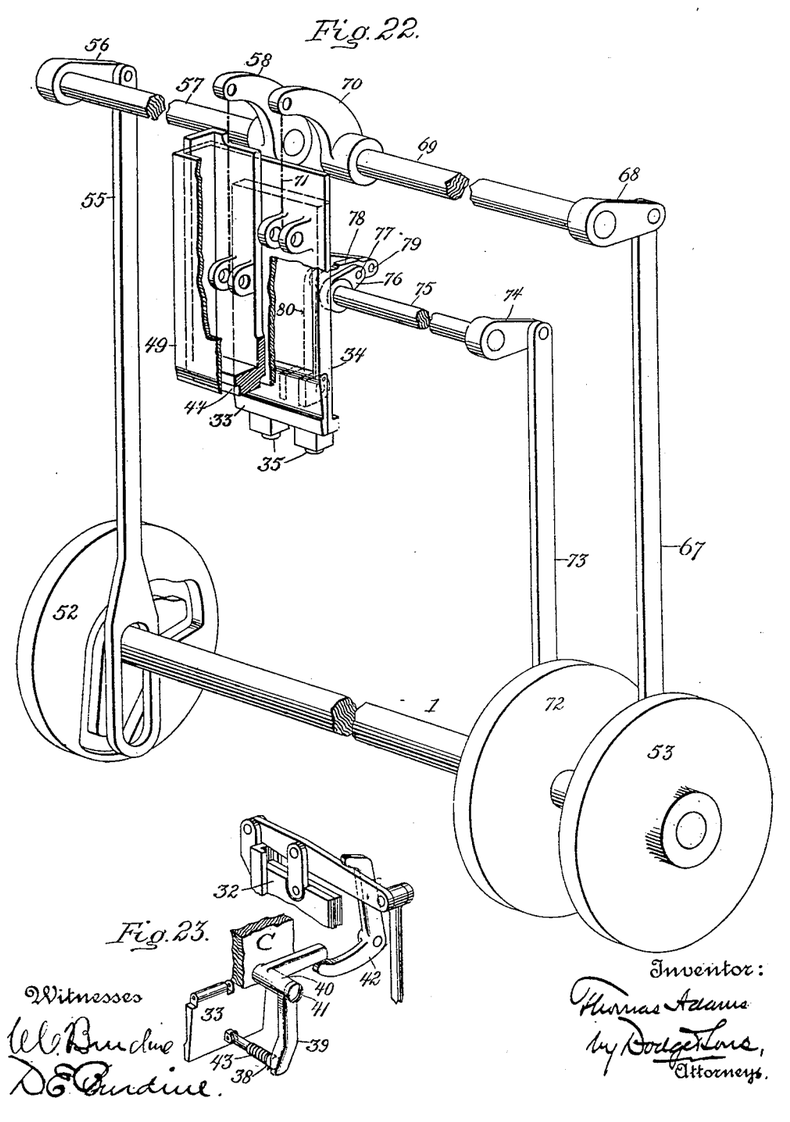
Fig. 22, a perspective view illustrating the mechanism for giving the movements to the several plungers or vertical slides of the wrapper-folding mechanism.
Fig. 23, a detached perspective view, illustrating the manner of controlling the abutment or stop plate which determines the position of the material to be wrapped.

At the ends of the main driving shaft 1, Figs. 1 and 3, are secured cam disks 52, 53, each of which has formed in its face a cam groove, the two grooves differing somewhat in form and in angular relation to the shaft; that of cam disk 52 is shown in Fig. 3, in full lines, and that of disk 53 is shown in said figure by dotted lines. Inasmuch as the groove in the cam disk 53 is of simple form and serves only to hold normally at rest and once in each revolution to rock the shaft which it controls, it is unnecessary to make further illustration of said groove, but the cam groove of disk 52 is of the peculiar form shown in Figs. 3 and 22, and by reason thereof, gives to the rock shaft which it controls and to the shell or plunger 49 actuated by or through it, the peculiar double motion and slight dwell hereinbefore described. This action is due to the two substantially radial branches of the groove, and to the slight curve or deflection of the groove in one of said radial branches, plainly shown in said figures. The cam groove 52 receives a stud or bowl 54, seen in Figs. 1 and 3, projecting from the proximate face of a vertical link 55, slotted to straddle the shaft 1, and to rise and fall relatively thereto, as the stud or bowl 54 is raised or lowered by the walls of the cam groove. The upper extremity of the link 55 connects,—as shown in Figs. 1 and 22, and by dotted lines in Fig. 3,—with an arm 56 secured to and projecting radially from a rockshaft 57 journaled in bearings on the top of cross bar C, and carrying at its inner end and about the midlength of the machine, a second arm 58 projecting toward the opposite side of the shaft 57 from that on which arm 56 extends. A link 59, advisably of two parts screwed together to facilitate adjustment, connects the arm 58 with the inner plunger or slide 44, and through motion imparted by the cam 52, through the link 55 and arms 56 and 58, causes said slide or inner plunger to rise and fall at the prescribed times.

The actuation of the outer plunger or shell 49 is effected through the movements imparted by the cam wheel 53 to a stud or bowl 66 of a link 67 straddling the shaft 1 and connected with one end of an arm or lever 68 secured to a rockshaft 69 carrying also an oppositely projecting arm 70 which is connected by a link 71 with said shell or outer slide 49.

For actuating the slide 34, there is provided a cam wheel 72, which acts upon a slotted link 73, essentially like the links 55 and 67, the upper end of which link 73 connects with an arm 74 carried by a rockshaft 75 journaled in bearings on the frame of the machine, and provided at its opposite end with a radial arm 76. Said arm 76 carries a pin 77 which takes in an opening in a lever 78 fulcrumed at 79 upon a supporting arm extending backward from the vertical plate C of the frame, the forward or free end of said lever 78 being connected by a link 80 with a stud or projection on the slide 34. Slide 37 is connected by a short link 81 with the upper end of a vibratory lever 82 carrying a bowl or stud, which, entering a cam groove in a wheel or disk 83, is at the proper times moved forward and backward. The mechanism for imparting motion to the other devices has been already sufficiently described.

The slides 13 and 14 are connected respectively by links 84 and 85 with elbow levers 86 and 87, in turn jointed to links 88, 89, connected at their lower ends to oscillating or swinging levers 90 and 91, as shown in Fig. 1, the levers 90 and 91, being pivoted at one end to uprights 92 and 93.

It is manifest that various minor changes may be made in the details of the structure without departing from the spirit of my invention; for instance, where covered cams are represented in the drawings their well-known equivalent, to wit, an open or surface cam with a co-acting spring to hold the actuated lever in contact with such surface, may be employed; and, generally, well-known mechanical movements and connections may be substituted for the specific forms shown in the drawings without departing from the invention.

In the foregoing description I have included the stop-arm or gage 33 and the parts by which it is positioned and tripped. These features, specifically considered, are not of my invention and are not claimed by me. They are shown and described herein for the purpose of showing the machine in its most complete and satisfactory form.

Having thus described my invention what I claim is:

1. In a machine for wrapping merchandise, the combination of a bed or table; means for placing upon said bed or table an outer wrapper blank; supports rising from said table to a height equal to or slightly in excess of the thickness of the body to be wrapped; means for placing an inner wrapper upon, and across the space between said supports; a plunger adapted to bear upon the body to be wrapped, and to force the same downward between the supports, whereby the inner wrapper has its ends turned upwardly and its face is brought in contact with that of the outer wrapper; and means for reciprocating the plunger.

2. In a machine for wrapping merchandise, the combination of a bed or table; raised supports upon said bed or table separated a distance equal to the length of the body to be wrapped plus slight clearance; a magazine for the merchandise, having a base or bottom raised slightly above the level of the supports on the table; a swinging bridge piece extending from said magazine base to a point over the supports and adapted to clamp a wrapper upon said supports; a slide or feeder movable across the base of the magazine and serving to push therefrom the requisite body of merchandise and to deliver the same across the bridge and upon a wrapper held thereby; a vertically moving plunger serving to force the body to be wrapped downward between the supports upon the table, and thereby to turn the ends of the wrapper upwardly; inwardly moving slides adapted to move over the depressed body and to turn the ends of the wrapper inward thereon toward each other, and provided with rollers or folders to act upon the vertical portions of the wrapper extending from bottom to top of the body, and to fold the same inward against the sides of said body; a hollow shell or slide adapted to move downward and to fold down lengthwise of the body the horizontally projecting edges of the wrapper; and means for actuating the several parts and for giving to the first plunger a further downward movement, whereby it is caused to force the partially formed package through an opening in the bed or table and thereby to fold upward lengthwise against its sides the horizontally projecting edges of the wrapper lying beneath said body.

3. In a wrapping machine, the combination of a table B, provided with an opening 29; slides 17 and 37 movable across said opening; blocks or supports 15 and 16 rising from said table to a height equal to the body of material to be wrapped; a supporting base 4; confining rods 6 rising from said base; a slide 7 movable across the base and serving to deliver merchandise therefrom; a bridge 11 extending from the base 4 to and over the supports 15 and 16; a gravitating plate 12 overhanging the bridge; slides 13 and 14 movable above the supports 15 and 16 and serving to fold the wrapper ends down upon the merchandise; and a compound or two-part plunger 44, 49, the part 44 adapted to first descend and bear upon the merchandise and wrapper lying above the supports 15 and 16 and to carry the same down to and upon the slide 17, and later upon the retraction of the slide, to force the package through the opening 29 in the table, and the slide 49 being adapted after the first or partial descent of the plunger 44, itself to descend and fold down the projecting edges of the applied wrapper.

4. In a wrapping machine, the combination of a table; raised supports above said table; means for delivering a wrapper between said supports; means for placing and for clamping a wrapper upon said supports; and a plunger movable downward relatively to said supports and serving by its downward movement to carry into the space between them the uppermost wrapper and the merchandise lying thereon, and thus to bend upward the ends of said wrapper.

5. In a wrapping machine, the combination of a bed or table; raised supports above said table; means for placing a wrapper between said supports; means for placing a wrapper upon said supports and across the intervening space; delivery mechanism adapted to deliver merchandise upon the wrapper upon the supports; a vertically-movable plunger serving to force the merchandise and the uppermost wrapper downward between the raised supports; and slides movable inward above said supports serving to fold inward upon the merchandise the ends of said wrapper.

6. In a wrapping machine, the combination of a bed or table having an opening of approximately the size of the package to be produced; raised supports above said table; means for placing a wrapper upon said supports and across the intervening space; delivery mechanism adapted to place merchandise upon said wrapper; a plunger adapted to bear upon and to force downward the merchandise and the wrapper between the raised supports, and thereby to turn or fold upwards the ends of the wrapper; slides movable inward above the supports and serving to fold or lay down upon the merchandise the ends of the wrapper; a second plunger movable relatively to the first and serving to turn down the projecting edges of the applied wrapper; and means for imparting to the first plunger longer or lower movement sufficient to force the package through the opening in the table and thereby to turn upward the projecting portions of the applied wrapper.

7. In a wrapping machine, the combination of a bed or table having an opening of approximately the size of the package to be produced; raised supports above said table; means for placing a wrapper upon said supports and across the intervening space; delivery mechanism adapted to place merchandise upon said wrapper; a plunger adapted to bear upon and to force downward the merchandise and the wrapper between the raised supports, and thereby to turn or fold upwards the ends of the wrapper; slides movable inward above the supports and serving to fold or lay down upon the merchandise the ends of the wrapper; rollers carried by said slides and serving to turn inward the vertical portions of the folded wrapper; a second plunger movable relatively to the first and serving to turn down the projecting edges of the applied wrapper; and means for imparting to the first plunger an additional movement sufficient to force the package through the opening in the table and thereby to turn upward the projecting portions of the applied wrapper.

8. In a wrapping machine, the combination of a bed or table having an opening of approximately the size of the package to be produced; raised supports above said table; means for placing an outer wrapper between said supports and across the opening in the table; means for placing a wrapper upon said supports and across the intervening space; delivery mechanism adapted to place merchandise upon said wrapper; a plunger adapted to bear upon and to force downward the merchandise and the wrapper between the raised supports, and thereby to turn or fold upwards the ends of the wrapper; slides movable inward above the supports and serving to fold or lay down upon the merchandise the ends of the wrapper; rollers carried by said slides and serving to turn inward the vertical portions of the folded wrapper; a second plunger movable relatively to the first and serving to turn down the projecting edges of the applied wrapper; means for imparting to the first plunger an additional movement sufficient to force the package through the opening in the table and thereby to turn upward the projecting portions of the applied wrapper; and slides movable over the table and above the opening and serving to fold down upon the package and upon the applied inner wrapper the overlapping edges of the outer wrapper.

9. In a wrapping machine, the combination of a bed or table; means for placing a wrapper thereon and for bending or folding the same across the ends of the merchandise; and slides movable over the remaining side or face of the merchandise and serving to fold down upon the same the ends of the wrapper, said slides being provided with rollers or members adapted to bear against and to turn in against the edges or sides of the merchandise those portions of the wrapper projecting outward beyond the sides of the merchandise at each end thereof.

10. In a wrapping machine, the combination of the following instrumentalities: first, means for placing in position an outer wrapper; second, means for placing above the same an inner wrapper; third, means for delivering upon the inner wrapper the merchandise to be wrapped; fourth, means for turning up across the ends of the merchandise the ends of the inner wrapper and simultaneously bringing the two wrappers into surface contact; fifth, means for folding inward upon the upper face of the merchandise the end portions of the inner wrapper and simultaneously tucking in or folding those portions of the wrapper lying in vertical planes; sixth, means for folding down upon the sides of the merchandise the horizontally projecting portions of the inner wrapper lying above the merchandise; seventh, means for turning upward the corresponding lower flaps or portions of the inner wrapper and with them the outer wrapper; eighth, means for turning or folding inward and placing one upon the other the edges of the outer wrapper, and lastly, means for connecting and operating the recited mechanisms in the manner and sequence stated.

In testimony whereof I have signed my name to this specification in the presence of two subscribing witnesses.

THOMAS ADAMS.

Witnesses:
WM. P. COOK,
F. L. COOK.